United States Patent
Nakamura

(10) Patent No.: US 9,017,747 B2
(45) Date of Patent: Apr. 28, 2015

(54) GLUTAMIC ACID CONTAINING SEASONING AND METHOD FOR PRODUCING THE SAME

(75) Inventor: Satoru Nakamura, Chiba (JP)

(73) Assignee: Kikkoman Corporation, Noda-Shi, Chiba (JP)

( * ) Notice: Subject to any disclaimer, the term of this patent is extended or adjusted under 35 U.S.C. 154(b) by 130 days.

(21) Appl. No.: 13/638,696

(22) PCT Filed: Mar. 30, 2011

(86) PCT No.: PCT/JP2011/058116
§ 371 (c)(1), (2), (4) Date: Oct. 1, 2012

(87) PCT Pub. No.: WO2011/125790
PCT Pub. Date: Oct. 13, 2011

(65) Prior Publication Data
US 2013/0022709 A1    Jan. 24, 2013

(30) Foreign Application Priority Data

Apr. 1, 2010 (JP) .................................. 2010-084872

(51) Int. Cl.
| | | |
|---|---|---|
| A23L 1/221 | (2006.01) | |
| A23L 1/223 | (2006.01) | |
| A23J 3/34 | (2006.01) | |
| A23L 1/228 | (2006.01) | |
| A23L 1/03 | (2006.01) | |

(52) U.S. Cl.
CPC ............. *A23L 1/228* (2013.01); *A23L 1/0305* (2013.01)

(58) Field of Classification Search
CPC ........... A23L 1/22; A23L 1/238; A23L 1/228; A23L 1/221; A23L 1/227; A23L 1/23; A23L 1/2008; A23L 1/105; A23L 1/0305; A23J 3/34; A23V 2250/5488; A23V 2250/0618; C12N 1/14; C12N 9/62
USPC ......... 426/18, 534, 60, 634, 46, 548, 656, 52, 426/44, 589, 56; 435/110
See application file for complete search history.

(56) References Cited

U.S. PATENT DOCUMENTS 3,888,224 A * 6/1975 Okuhara et al. ............. 426/126
6,858,405 B1 * 2/2005 Nakamura et al. ........... 435/68.1

FOREIGN PATENT DOCUMENTS

| CN | 1298454 A | 6/2001 |
|---|---|---|
| CN | 1593239 A | 3/2005 |
| EP | 0846423 B1 | 7/2002 |
| JP | 4867461 | 9/1973 |
| JP | 4868789 | 9/1973 |
| JP | 57058870 A | 4/1982 |
| JP | 62181754 A | 8/1987 |
| JP | 63094974 A | 4/1988 |
| JP | 05-123131 A | 5/1993 |
| JP | 06-062793 A | 3/1994 |
| JP | 10-165137 A | 6/1998 |
| JP | 11313693 A | 11/1999 |
| JP | 11332553 A | 12/1999 |
| JP | 2000-014394 A | 1/2000 |
| JP | 2001-046009 A | 2/2001 |
| JP | 2005328738 A | 12/2005 |

OTHER PUBLICATIONS

JP 06062793—(1996)—Machine Translation.*
Tatsumi, H. et al. Mol. Gen Genet (1991) 228: 97-103.*
CN Office Action for CN Application No. 201180015434.3 dated May 13, 2013.
Zhang, "Fermentation Tech Comm." 1981. No. 4, pp. 14-18.
International Search Report and Written Opinion dated Jun. 28, 2011 corresponding to International Patent Application No. PCT/JP2011/058116.

* cited by examiner

*Primary Examiner* — Hamid R Badr
(74) *Attorney, Agent, or Firm* — Squire Patton Boggs (US) LLP

(57) ABSTRACT

Provided are a seasoning that contains deep and rich flavor of ingredients mainly composed of a large amount of glutamic acid, and a method for producing the seasoning. The glutamic acid content in a glutamic acid containing seasoning liquid thus produced is not lowered even after long-term storage thereof. Herein, a protein raw material such as wheat gluten, defatted soybeans, and an extracted residue of dried and fermented fish shavings is enzymatically decomposed by the liquid koji. In that step, a zinc containing compound or zinc yeast is added to the mixture of the raw materials such that the zinc concentration is set in the range from 5 ppm or more to 700 ppm or less as a conversion amount of pure zinc. This procedure facilitates the enzymatic decomposition to produce an excellently flavored seasoning liquid or powder including a large amount of glutamic acid.

6 Claims, 2 Drawing Sheets

GLUTAMIC ACID CONTAINING SEASONING AND METHOD FOR PRODUCING THE SAME

FIELD OF THE INVENTION

The present invention relates to a seasoning including a relatively large content of glutamic acid (or a seasoning liquid). Namely, the present invention relates to a glutamic acid containing seasoning and a method for producing a glutamic acid containing seasoning. Herein, the glutamic acid content in the seasoning has a relatively large value and little lowers therein throughout long-term storage.

BACKGROUND OF THE INVENTION

A method for enzymatically decomposing a protein raw material by liquid koji, the protein raw material containing a lot of glutamic acid, has been well known to have the glutamic acid content increase in a seasoning liquid (for example, see Patent Documents 1 to 4).

However, the method using those conventional techniques comprises the step of having liquid koji coexist with glutaminase producing microorganisms, or adding an enzyme source such as glutaminase during the enzymatic decomposition. Accordingly, it has been difficult to increase the glutamic acid content in the seasoning liquid without using glutaminase producing microorganisms or an enzyme source such as glutaminase.

Herein, glutaminase producing microorganisms have been known, including *Rhodotorula* (for example, see Patent Document 5), *Bullera* (for example, see Patent Document 6) and *Cryptococcus* (for example, see Patent Documents 7-9) or the like. Further, enzyme sources of glutaminase or the like have been also known, including the enzyme sources derived from *Cryptococcus* (for example, see Patent Document 7) and yeast (for example, see Patent Document 10).

Meanwhile, in the technological field of producing a soy sauce, a method for increasing a glutamic acid content in a seasoning liquid has been known as described in the following. That is, such a method comprises the steps of: producing solid koji by adding a predetermined amount of zinc ions into koji producing raw materials when solid koji is to be prepared; and producing a soy sauce of which glutamic acid content is greatly high by using the resultant soy sauce koji (for example, see Patent Document 11). Herein, note the above mentioned soy sauce koji has ten-fold higher leucine aminopeptidase activity than the soy sauce made from the koji producing raw materials added with no zinc ions. See, for example, Patent Document 11.

However, when a protein raw material is enzymatically decomposed by liquid koji, no method for adding zinc ions to raw materials has been known yet. According to experiments conducted by the present inventors, when liquid koji was prepared, even though a predetermined amount of zinc ions were included in a liquid culture medium, those experiments demonstrated that the leucine aminopeptidase activity was incapable of being increased. That is, the present inventors found that the effect of increasing the leucine aminopeptidase activity by adding zinc ions as disclosed in Patent Document 11 was restricted to only the case using the solid koji in the technological field of producing a soy sauce.

In the meantime, when a protein raw material is enzymatically decomposed, a method for obtaining protein hydrolysates in a short time and a high yield has been known, comprising the steps of: decomposing a protein raw material by using an acidic protease or a material including an acidic protease under the conditions that the concentration of bivalent metal ions such as calcium ions and magnesium ions becomes at least 0.01 molar or more in the enzymatic decomposition solution within an acidic pH range (for example, see Patent Document 12).

However, Patent Document 12 describes calcium ions and magnesium ions, while the same document describes no bivalent ions besides the above mentioned ions (for example, manganese ions, zinc ions and cobalt ions or the like). Moreover, Patent Document 12 describes an acidic protease or a material including an acidic protease as an exemplary enzyme, while no liquid koji is described therein. Furthermore, Patent Document 12 does not describe or suggest any of the enzymatic decomposition of a protein raw material through combining liquid koji with zinc ions.

As obvious according to the above mentioned explanation, when a protein raw material is enzymatically decomposed by liquid koji, no method for producing a seasoning liquid has been known yet, comprising the steps of: adding a zinc source into an enzymatic decomposition solution under the conditions so that the concentration of zinc ions is set in a predetermined value therein; and increasing a glutamic acid content by the zinc ion addition.

PRIOR ART DOCUMENTS

Patent Literatures

Patent Document 1: Japanese Unexamined Patent Application Publication No. H11-127812
Patent Document 2: Japanese Unexamined Patent Application Publication No. 2007-74911
Patent Document 3: Japanese Examined Patent Application Publication No. S51-33196
Patent Document 4: Japanese Examined Patent Application Publication No. S48-43637
Patent Document 5: Japanese Examined Patent Application Publication No. S57-55388
Patent Document 6: Japanese Examined Patent Application Publication No. H01-16465
Patent Document 7: Japanese Unexamined Patent Application Publication No. 2005-328738
Patent Document 8: Japanese Patent No. 3712530
Patent Document 9: Japanese Examined Patent Application Publication No. S49-48759
Patent Document 10: Japanese Unexamined Patent Application Publication No. S63-94974
Patent Document 11: Japanese Unexamined Patent Application Publication No. H06-62793
Patent Document 12: Japanese Examined Patent Application Publication No. S49-13976

DISCLOSURE OF THE INVENTION

Problems to be Solved by the Invention

Conventionally, a method for producing a seasoning liquid having a high content of a flavor ingredient such as glutamic acid by enzymatically decomposing a protein raw material which contains a lot of glutamine has been generally conducted. However, the method has been incapable of increasing the glutamic acid content without coexisting glutaminase producing microorganisms, or without adding an enzyme source such as glutaminase, in an enzymatic decomposition solution.

Further, a seasoning liquid containing glutamic acid generally obtained by enzymatically decomposing a protein raw material by liquid koji gradually decreases a glutamic acid content throughout long-term storage.

The present invention is directed to the improvement of a method for producing a seasoning liquid having a high content of a flavor ingredient such as glutamic acid by enzymatically decomposing a protein raw material through liquid koji, the protein raw material containing a lot of glutamine. Thus, an object of the present invention is to provide a glutamic acid containing seasoning which has an increased glutamic acid content and a method for producing a glutamic acid containing seasoning, the method being conducted without coexisting glutaminase producing microorganisms or without adding an enzyme source such as glutaminase while the protein raw material is enzymatically decomposed Further, another object of the present invention is to provide a glutamic acid containing seasoning in which a glutamic acid content hardly lowers throughout long-term storage and a method for producing such a glutamic acid containing seasoning.

Means for Solving the Problems

The present inventors have earnestly investigated the method to overcome the above mentioned drawbacks. Accordingly, it was found that when the protein raw material was enzymatically decomposed by the liquid koji, the addition of a zinc source under the condition that the concentration of zinc ions in the enzymatically decomposed liquid was set at 5 ppm or more as a conversion amount of pure zinc enabled a seasoning liquid to contain a lot of an enriched flavor ingredient, without coexisting glutaminase producing microorganisms or without adding an enzyme source such as glutaminase, in the enzymatic decomposition liquid.

Further, in general a glutamic acid containing seasoning liquid obtained via enzymatic decomposition of a protein raw material by the liquid koji is gradually lowering the contained glutamic acid therein throughout long-term storage. However, besides the above mentioned effect on the enriched glutamic acid content, the inventors have also found an effect excellent in the storage of the seasoning liquid. That is, if the zinc yeast was added as a zinc source in the enzymatic decomposition liquid, after the decomposition step, the long-term storage of the resultant glutamic acid containing seasoning liquid hardly lowered the glutamic acid content included therein. Eventually, the inventors have realized the present invention based on those outstanding findings.

Namely, the present invention provides the following glutamic acid containing seasoning and the method for producing the seasoning.
(1) A glutamic acid containing seasoning liquid that contains zinc of which concentration is set in the range from 5 ppm or more to 700 ppm or less as a conversion amount of pure zinc, and a lowering rate of glutamic acid in the seasoning liquid is 2% or less, when stored at 15° C. of a goods temperature after the seasoning liquid has been filled in a storage vessel.
(2) A method for producing a glutamic acid containing seasoning liquid, comprising the steps of: adding a zinc containing compound into a mixture of a protein raw material and the liquid koji under the condition so that the zinc concentration in the enzymatic decomposition liquid in which the protein raw material is enzymatically decomposed by the liquid koji is set in the range from 5 ppm or more to 700 ppm or less as a conversion amount of pure zinc; and completing the enzymatic decomposition of the protein raw material.
(3) In the method for producing a glutamic acid containing seasoning liquid as described in above Section (2), the zinc containing compound is zinc sulfate or zinc gluconate.
(4) A method for producing a glutamic acid containing seasoning liquid, comprising the steps of: adding zinc yeast into a mixture of a protein raw material and the liquid koji under the condition so that the zinc concentration in the enzymatic decomposition liquid in which the protein raw material is enzymatically decomposed by the liquid koji is set in the range from 5 ppm or more to 700 ppm or less as a conversion amount of pure zinc; and completing the enzymatic decomposition of the protein raw material.
(5) In the method for producing a glutamic acid containing seasoning liquid as described in any one of above Section (2) to Section (4), the protein raw material is wheat gluten or an extraction residue of dried and fermented fish shavings.
(6) A method for producing a glutamic acid containing seasoning liquid, comprising the step of drying the seasoning liquid obtained in the method for producing a glutamic acid containing seasoning liquid as described in any one of above Section (2) to Section (5) into dry seasoning powder.

Advantageous Effects of the Invention

According to the present invention, a seasoning liquid having a lot of the enriched flavor ingredient content mainly composed of glutamic acid may be obtained. Further, even though the seasoning liquid is stored for a long-term, a glutamic acid containing seasoning liquid in which the glutamic acid content included therein hardly lowers may be obtained.

BRIEF DESCRIPTION OF THE DRAWINGS

FIG. 2 shows the effect of the zinc source addition on the concentrations of the various amino acids in the enzymatic decomposition liquid. More specifically, one of the enzymatic decomposition liquids is produced by enzymatically decomposing the protein raw material by adding a zinc source (for example, zinc gluconate, zinc sulfate and zinc yeast) therein, when the protein raw material is decomposed by the liquid koji. The other enzymatic decomposition liquid is produced by enzymatically decomposing the protein raw material without adding a zinc source therein, when the protein raw material is decomposed by the liquid koji.

EMBODIMENTS FOR CARRYING OUT THE INVENTION

Figure 1:
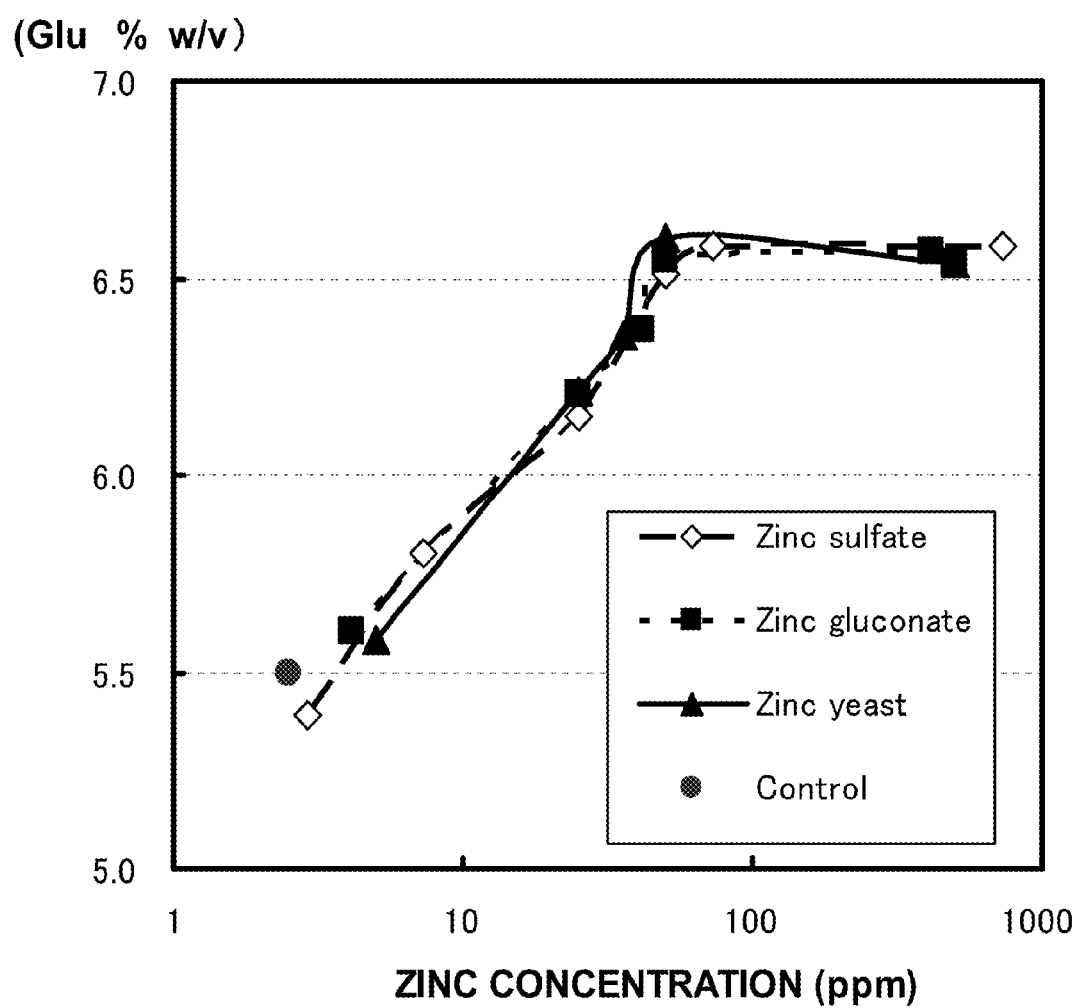
FIG. 1 is a graphic diagram indicating the relationship between the zinc concentration calculated as a conversion amount of pure zinc in the glutamic acid containing seasoning liquid and the accumulated produced amount of glutamic acid, obtained by changing the added zinc quantity. Herein, the glutamic acid containing seasoning liquid is produced by enzymatically decomposing wheat gluten using the liquid koji.

Hereinafter, the embodiments of the present invention will be explained.

A protein raw material used in the method for producing a glutamic acid containing seasoning liquid in the embodiment of the present invention, (hereinafter, referred to as the "production method in the embodiment"), includes vegetable protein raw materials having a lot of a glutamic acid content such as wheat gluten, corn gluten, defatted soybeans, soybeans, and grains of wheat or the like; and animal protein raw materials such as fish meat, fish meat protein, meat, an extracted residue of dried and fermented fish shavings or the like. Those protein raw materials are used alone or the combination thereof in the production method of the embodiment.

The extracted residue of dried and fermented fish shavings is prepared in a usual method comprising the steps of, for example, having water (or hot water) or alcohol contact with grinned or scraped dried and fermented fish shavings such as dried bonito, dried mackerel, and dried bullet mackerel; performing a usual extraction process with or without heating the material; and preparing condensed soup stock.

Further, the liquid koji used in the production method of the embodiment includes liquid koji prepared in a conventionally known method for producing liquid koji such as the methods described in Japanese Unexamined Patent Application Publication No. 2002-218970 and Patent Document 1 to Patent Document 4.

For example, to a liquid culture medium where microorganisms belonging to Aspergillus are able to grow, incubated are microorganisms belonging to Aspergillus (for example, Aspergillus oryzae, Aspergillus sojae, Aspergillus tamari, Aspergillus usamii, and Aspergillus niger or the like). Then, the microorganisms are cultured at 25 to 35° C., under aerobic conditions (or under aeration stirring) for a time which allows the accumulated production quantity of the target enzyme to become the maximum, and the culturing is finished. This allows the liquid koji to be obtained, used in the production method of the embodiment.

The liquid culture medium includes a medium (pH 5-8) appropriately containing a carbon source such as soluble starch, glucose, wheat bran or the like; a nitrogen source such as soybean powder, soy protein isolate, yeast extract or the like; an antifoaming agent such as silicone oil; and a micronutrient (that is, $CaCl_2$, $KH_2PO_4$ and $MgSO_4$ or the like).

The production method of the embodiment comprises the steps of: mixing the liquid koji and the protein raw material; further adding a zinc source explained hereinafter to form a mixture; stirring the mixture at 35 to 50° C. for 1 to 10 days, preferably keeping the mixture at 40 to 45° C. for 4 to 8 days thereby to enzymatically decompose the protein raw material; producing an unrefined soy sauce composing a decomposition liquid (or unrefined soy liquid) and an insoluble solid material (that is, a heterogeneous mixture produced after the enzymatic decomposition); compressing the undefined soy sauce to produce an enzymatic decomposition liquid. The enzymatic decomposition liquid is filtered to produce a glutamic acid containing seasoning liquid (hereinafter, referred to as a "seasoning liquid"). Herein, if the enzymatic decomposition liquid is clear, the enzymatic decomposition liquid may be used as a seasoning liquid as it is without filtering it.

In the production method of the embodiment, the use of the zinc source is extremely essential when the protein raw material is enzymatically decomposed by the liquid koji. Here, the key data is that the addition of the zinc source allows a seasoning liquid having the enriched glutamic acid content to be obtained without coexisting glutaminase producing microorganisms or without adding the enzyme source such as glutaminase.

The zinc source used in the embodiment includes zinc sulfate, zinc gluconate, and zinc yeast or the like. When zinc yeast is used among the zinc sources, besides the above mentioned advantageous effects, such an excellent effect is exerted as the glutamic acid content included in the produced seasoning liquid hardly lowers, even though the seasoning liquid is stored for a long-term.

The zinc yeast used in the method of the embodiment is food yeast containing zinc in a high concentration, including commercially available zinc yeast (that is, containing zinc in 1% w/w or more, preferably 5 to 15% w/w per dried fungus bodies), or zinc yeast prepared in the known method (for example, the method described in Japanese Unexamined Patent Application Publication No. H08-332082).

The zinc yeast is prepared by the steps of: suspending the yeast cells in a zinc containing solution at a high zinc concentration, the solution containing a lot of a water-soluble zinc salt; stirring and/or vibrating the suspension under a non-proliferating condition; and introducing a lot of zinc inside the yeast cells.

The zinc source used in the production method of the embodiment is required to add zinc at such an amount as the zinc concentration in the enzymatic decomposition liquid produced in the above mentioned production method becomes 5 ppm or more, into the resultant mixture. Herein, the zinc concentration in the enzymatic decomposition liquid is preferably 5 to 700 ppm, more preferably 25 to 100 ppm, and most preferably 40 to 70 ppm. If the zinc concentration in the enzymatic decomposition liquid is less than 5 ppm, the produced glutamic acid in the seasoning liquid is not sufficiently accumulated, leading to the unfavorable result.

Then, the production method continues with the steps of: compressing the unrefined soy sauce in which the enzymatic decomposition of the protein raw material is completed to obtain an enzymatic decomposition liquid (or unrefined soy liquid); subsequently clearing the resultant enzymatic decomposition liquid by filtering via kieselguhr, filtering via active carbon, and filtrating via a paper filter where necessary, thereby to produce a seasoning liquid of the present invention. Herein, the glutamic acid concentration and the zinc concentration in the enzymatic decomposition liquid are the same as the glutamic acid concentration and the zinc concentration in the seasoning liquid.

The seasoning liquid obtained in the present invention has an about 20 to 30% higher glutamic acid concentration than the concentration thereof obtained in the conventional method for adding no zinc source. Further, the seasoning liquid obtained by using the zinc yeast in the production method of the embodiment has an advantageous property that the reducing rate of the glutamic content after long-term storage is 2% or less, in addition to the above mentioned advantageous characteristics.

The seasoning liquid obtained in the embodiment has a quite high concentration of glutamic acid, allowing the quality of the flavor to be improved, which provides a deep and rich flavor with the seasoning liquid.

The seasoning liquid of the present invention may be used alone, or by mixing another seasoning liquid and drying the seasoning liquid to be dry powder by the known dry powdering process in the method for producing usual seasoning powder or a powdered soy sauce or the like. Hereby, the resultant dry seasoning powder may be used as glutamic acid containing seasoning powder.

The seasoning powder obtained at that time contains zinc in 10 ppm or more, particularly in 10 to 280 ppm.

Hereinafter, the present invention will be more specifically explained referring to EXAMPLES. However, the present invention is not limited to those EXAMPLES.

EXAMPLES

Example 1

Example for Calculating Relationship between Zinc Concentration in Decomposed Liquid Produced by Enzymatically Decomposing Wheat Gluten via Liquid Koji and Production Yield of Glutamic Acid (1) Preparation of Liquid Koji Into a fermentation tank (2000 L of volume), were added wheat bran (80 kg) and water (1600 L), and then a pH value of the mixture was adjusted at pH6.5. The resultant mixture was sterilized by heat in a usual method.

Next, to the resultant mixture, was added a liquid culture material (4 L) of *Aspergillus oryzae*, the culture material being prepared separately, thereby to sufficiently mix the materials. Then, aerated and agitated culture was incubated in a usual method for 72 hrs, thereby to obtain liquid koji.

(2) Enzymatic Decomposition

The obtained liquid koji (192 g), salt (23 g), and wheat gluten powder (70 g) were mixed to prepare a mixture. To the resultant mixture, were added various amounts of the zinc source such that each zinc concentration of the enzymatic decomposition liquid, the enzymatic decomposition liquid having been prepared via enzymatically decomposing the included wheat gluten powder beforehand, was set at the concentration in the range from 0 ppm to 700 ppm as a conversion amount of pure zinc, as shown in FIG. 1. Thus, a plurality of mixtures each having different content of a zinc source were prepared. As the zinc source, zinc sulfate, zinc gluconate, and zinc yeast were used to prepare a plurality of mixtures each having different amount of a zinc source thus included. Then, the respective mixtures thus prepared were placed in Erlenmeyer flasks respectively to be kept under an air permeable condition. The resultant mixtures were kept at the constant temperature of 40° C. for two days and further kept at 45° C. for four days.

While the flasks were kept at the constant temperatures for six days, the respective mixtures in Erlenmeyer flasks were shacked at the rate of 120 times shaking per one minute by a shaking incubator, allowing the respective mixtures to be intermittently stirred. In the enzymatic decomposition step, each unrefined soy sauce, which was comprised of an enzymatic decomposition liquid produced by enzymatically decomposing wheat gluten powder (or unrefined soy liquid) and an insoluble solid substance, was prepared from a plurality of mixtures each in which the included zinc source was different each other and the included amount of the zinc source was also different each other.

Then, the respective unrefined soy sauces thus obtained were pressed to produce enzymatic decomposition liquids, and the enzymatic decomposition liquids were further filtered through a paper filter, thereby to obtain seasoning liquids, respectively.

Each seasoning liquid thus obtained was analyzed on the zinc concentration, the glutamic acid concentration, the total nitrogen content, the Salt concentration, and the water content. Herein, the zinc concentration was analyzed based on a free zinc concentration in ICP (Inductively Coupled Plasma) atomic emission spectroscopy (PerkinElmer Co., Ltd; Optima 3300XL). The glutamic acid concentration was analyzed by an immobilized enzyme electrode-flow-injection method (Oji Scientific Instruments; Biosensor BF-5). The total nitrogen content was analyzed by the Kjeldahl method (Actac Co., Ltd.; Kjeltec auto-sampler system 1035). The salt concentration was analyzed by a potentiometric titration (Mettler-Toledo International Inc.; DL50). The water content was analyzed by a drying method under a reduced pressure (Yamato Scientific Co., Ltd., square typed vacuum thermostatic dry oven DP32).

Then, were analyzed production yields (or accumulated production yields) and zinc concentrations of glutamic acid in the seasonings having different zinc sources and zinc concentrations. FIG. 1 shows the results of the analyses. More specifically, FIG. 1 shows the relationships between the zinc concentrations and the accumulated production yields of glutamic acid, when wheal gluten was enzymatically decomposed by liquid koji while changing the added zinc amount, the zinc concentrations being calculated by the pure zinc conversion amounts in the glutamic acid containing seasonings after completion of the enzymatic decomposition thereof. Herein, the relationships thus calculated are shown for the respective zinc sources.

The results in FIG. 1 demonstrate that the glutamic acid concentration in the enzymatic decomposition liquid is not almost changed between the case in which the zinc source is added to the mixture such that the zinc concentration is set at 3 ppm as a conversion amount of pure zinc when wheal gluten is enzymatically decomposed, and the case in which no zinc source is added. Accordingly, the above mentioned cases demonstrate that glutamic acid in the enzymatic decomposition liquid is not sufficiently produced and accumulated.

In contrast, if the zinc source is added at 5 ppm or more to the mixture, including zinc sulfate, zinc gluconate, and zinc yeast, until the zinc concentration reaches 50 ppm, the accumulated production yield of glutamic acid in the enzymatic decomposition liquid is increased in proportion to the log value of the zinc concentration. Further, if the zinc concentration is increased up to 50 ppm or more, the accumulated production yield of glutamic acid in the enzymatic decomposition liquid substantially becomes constant. Therefore, according to the method for producing a glutamic acid containing seasoning of the present invention, it is demonstrated that the addition of the zinc source at 5 ppm or more increases the accumulated production yield of glutamic acid in the enzymatic decomposition liquid.

Example 2

Example of Analyzing Relationship Between Zinc Source Type and Reduction Ratio of Glutamic Acid Content in Storage Period First, the liquid koji (192 g) obtained in EXAMPLE 1, Salt (23 g), and wheat gluten powder (70 g) were mixed, to prepare a mixture.

To the mixture thus prepared, under the conditions that the zinc concentration in each enzymatic decomposition liquid after completion of the enzymatic decomposition was set at 50 ppm as a conversion amount of pure zinc, the respective mixtures added with three different zinc sources shown in FIG. 1 were placed in the Erlenmeyer flasks respectively, with keeping air permeability. Then, the divided respective mixtures were stored at the constant temperature of 40° C. for 2 days, and further 45° C. for 4 days. In the storage period of the 6 days with keeping the constant temperatures, the mixture in each Erlenmeyer flask was shook at the rate of 120 times per one minute by a shaking incubator, thereby to be constantly stirred. Accordingly, that enzymatic decomposition step allows an unrefined soy sauce to be produced by the three different typed zinc sources contained in the respective mixtures. Then, each unrefined soy sauce thus prepared was pressed to produce an enzymatic decomposition liquid, and further filtered through a paper filter. After those steps, were produced seasoning liquids in EXAMPLES A, B and C.

Further, for comparing the results to the result of a control sample, another unrefined soy sauce was produced through the same enzymatic decomposition step, by adding no zinc source to the resultant mixture, to produce a seasoning liquid in COMPARATIVE EXAMPLE A.

Figure 2:
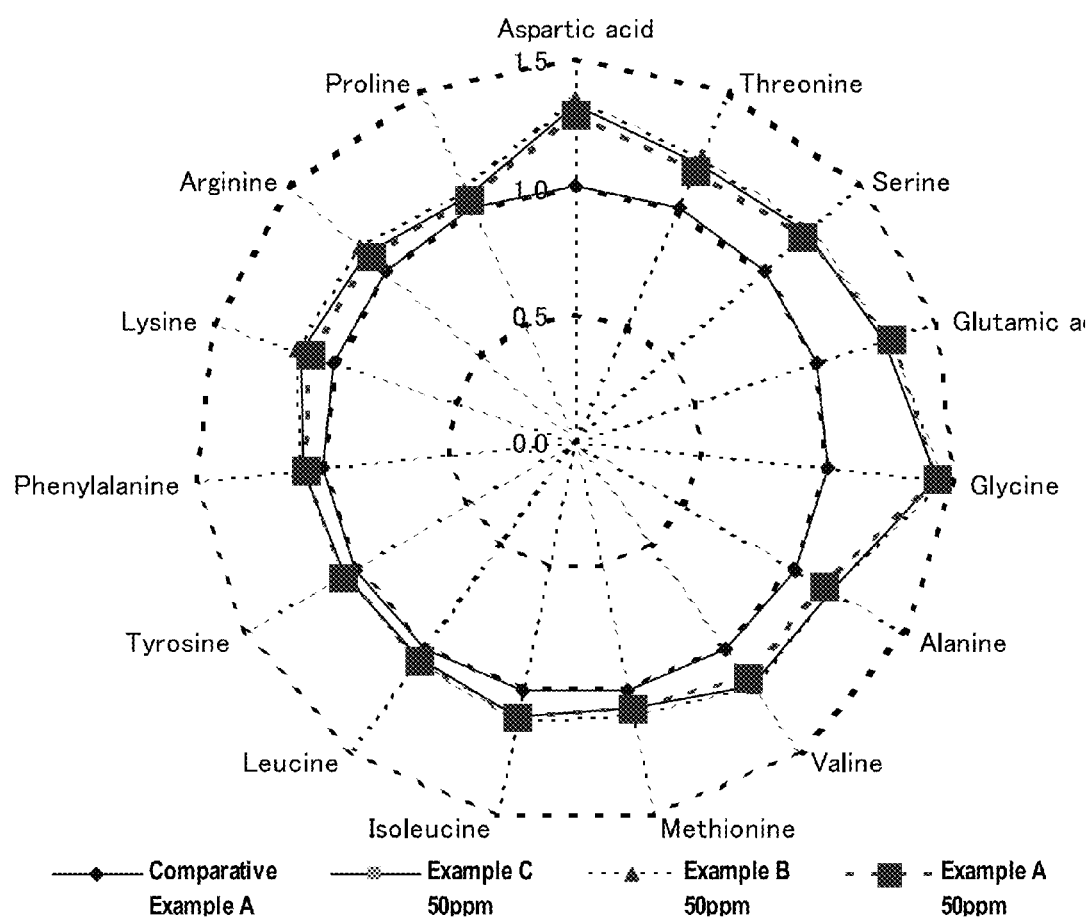
FIG. 2 is a pattern diagram of the various amino acid concentrations, created by indicating the results of adding a zinc source in the enzymatic decomposition liquid compared to the results of adding no zinc source therein. That is.

Each of the seasoning liquids in EXAMPLES A, B, C and COMPARATIVE EXAMPLE A (each 14 ml) was put in a test tube (15 ml volume) having a screw portion at the periphery of the top opening. The opening portion was air-tightly sealed by a cap, to prepare a glutamic acid containing seasoning liquid filled in a test tube used as an experimental vessel. Then, each test tube was stored at a goods temperature of 15° C. in a thermostatic chamber for 9 months. Herein, were analyzed the glutamic acid concentrations, the differences in the concentrations, and the lowering ratios of glutamic acid concentrations in the respective seasoning liquids, measured at the initial analysis timing and the end analysis timing throughout the storage. Table. 1 summarizes the results.

the initial timing) in COMPARATIVE EXAMPLE A, EXAMPLES A to C obtained in the preparation steps. FIG. 2 shows all of the results. Herein, FIG. 2 shows relative concentrations of the various amino acids in the four typed seasoning liquids. Here, the relative concentrations of the various amino acids were defined by comparing each amino acid concentration to the corresponding amino acid concentration of COMPARATIVE EXAMPLE A added no zinc source. Herein, the corresponding amino acid concentration of COMPARATIVE EXAMPLE A was set in 1 as a control value.

The results in FIG. 2 (indicating a content pattern of various amino acids) demonstrate that each amino acid content, in which the glutamic acid content is a main data, in every seasoning liquid in EXAMPLES A to C is more increased than the corresponding amino acid content in the seasoning liquid of COMPARATIVE EXAMPLE A. Therefore, according to the glutamic acid containing seasoning liquid of the present invention, it is demonstrated that a glutamic acid containing liquid of which respective contents of the amino acid including glutamic acid are increased may be produced.

TABLE 1

| SEASONING LIQUID | TYPE OF ZINC SOURCE | TOTAL NITROGEN AMOUNT (% w/v) | GLUTAMIC ACID CONCENTRATION (% w/v) | | | |
| --- | --- | --- | --- | --- | --- | --- |
| | | | INITIAL | AFTER STORAGE | DIFFERENCE IN CONC. | LOWERING RATIO (%) |
| COMPARATIVE EXAMPLE A | NO ADDITION | 3.6 | 5.4 | 4.5 | 0.9 | 16.7 |
| EXAMPLE A | ZINC SULFATE | 3.6 | 6.5 | 5.9 | 0.6 | 9.2 |
| EXAMPLE B | ZINC GLUCONATE | 3.6 | 6.4 | 5.3 | 1.1 | 17.1 |
| EXAMPLE C | ZINC YEAST | 3.6 | 6.5 | 6.4 | 0.1 | 1.5 |

The results listed in Table 1 show that COMPARATIVE EXAMPLE A, in which no zinc source was added when wheat gluten was enzymatically decomposed by the liquid koji, indicates that the glutamic acid content is incapable of greatly increasing, and the glutamic acid content lowers in 16.7% after the seasoning liquid was stored for a ling-term (that is, 9 months).

In contrast, the results in Table 1 indicate that in EXAMPLES A to C in which zinc sources such as zinc sulfate, zinc gluconate and zinc yeast were added to the respective mixtures in the enzymatic decomposition step, were produced glutamic acid containing seasoning liquids each having an about 20% higher glutamic acid content than the glutamic acid containing seasoning liquid in COMPARATIVE EXAMPLE A.

Further, in EXAMPLE C in which zinc yeast was added, selected from the three typed zinc sources of EXAMPLES, the glutamic acid content increased in about no less than 20% compared to the glutamic acid content in COMPARATIVE EXAMPLE A. Moreover, even though the seasoning liquid was stored for a long-term (for example, 9 months), it is demonstrated that was produced a seasoning liquid in which the glutamic acid content in the seasoning liquid hardly lowered (lowering ratio=1.5%).

Furthermore, is analyzed the pattern of the various amino acids content included in the respective seasoning liquids (at Example 3

Example of Producing Glutamic Acid Containing Seasoning Liquid Produced by Enzymatically Decomposing Extracted Residue of Dried Bonito Shavings by Liquid Koji The liquid koji (192 g) prepared in EXAMPLE 1, Salt (23 g) and a fresh hot water extracting residue of dried bonito shavings (water content=50% w/w; 100 g) were mixed to prepare a mixture.

To the resultant mixture, was added zinc sulfate, zinc gluconate or zinc yeast under the conditions such that the zinc concentration in the enzymatic decomposition liquid after completion of the enzyme decomposition step, was set at 50 ppm as a conversion amount of pure zinc. Then, the same steps as in EXAMPLE 1 were conducted, resulting in the production of a glutamic acid containing seasoning liquid.

Further, in order to compare the results in EXAMPLE 3 to other EXAMPLES and COMPARATIVE EXAMPLE, another unrefined soy sauce was produced via the same enzymatic decomposition step, resulting in the production of a glutamic acid containing seasoning liquid in COMPARATIVE EXAMPLE B.

Those glutamic acid containing seasoning liquids were filled in sealed test tubes the same as in EXAMPLE 2, stored at a goods temperature of 15° C. for 2 months in a thermostatic chamber. Then, were analyzed the respective concentrations of glutamic acid at the initial timing and the end timing after the end of the storage, the differences in concentrations between the values at the initial timing and the end timing, and the lowering ratios of the glutamic acid concentrations. Table 2 shows all of the results.

TABLE 2

| SEASONING LIQUID | TYPE OF ZINC SOURCE | TOTAL NITROGEN AMOUNT (% w/v) | GLUTAMIC ACID CONCENTRATION (% w/v) | | | |
|---|---|---|---|---|---|---|
| | | | INITIAL | AFTER STORAGE | DIFFERENCE IN CONC. | LOWERING RATIO (%) |
| COMPARATIVE EXAMPLE B | NO ADDITION | 1.6 | 1.1 | 1.0 | 0.1 | 9.0 |
| EXAMPLE D | ZINC SULFATE | 1.6 | 1.4 | 1.3 | 0.1 | 7.1 |
| EXAMPLE E | ZINC GLUCONATE | 1.6 | 1.4 | 1.3 | 0.1 | 7.1 |
| EXAMPLE F | ZINC YEAST | 1.6 | 1.4 | 1.4 | 0.0 | 0.0 |

The results in Table 2 show that the glutamic acid content is incapable of markedly increasing, if no zinc source is added (COMPARATIVE EXAMPLE B) when the extracted residue of dried bonito shavings is enzymatically decomposed by the liquid koji. Further, the results also show that the seasoning liquid in COMPARATIVE EXAMPLE B lowers the glutamic acid content in 9.0% after the end of the storage.

In contrast, if the zinc source is added (EXAMPLES D to F), it is shown that a seasoning liquid of which glutamic acid content is increased in 27% compared to that of COMPARATIVE EXAMPLE B may be obtained.

Further, among the 3 typed zinc sources, in EXAMPLE F in which the zinc yeast is added to the corresponding seasoning liquid, it is shown that the glutamic acid content in the seasoning liquid is not lowered even throughout the long-term storage thereof, besides indicating the above mentioned outstanding effect on the greatly improved increase in the glutamic acid content.

Example 4

Next, four typed mixtures in COMPARATIVE EXAMPLES C AND D, and EXAMPLES G and H as shown in Table 3 were prepared by using the liquid koji obtained in EXAMPLE 1. Herein, no zinc source was added to the respective mixtures of COMPARATIVE EXAMPLES C and D, while the zinc yeast was added to the respective mixtures of EXAMPLES G and H. Further, to the respective mixtures in COMPARATIVE EXAMPLES D and EXAMPLE H, was added water to dilute the liquid koji.

Each of those four typed mixtures was placed in an Erlenmeyer flask under the condition with keeping air permeability, and kept at a constant temperature of 39° C. for 2 days, and further 45° C. for 4 days in a thermostatic chamber. In the period of the six days with keeping the constant temperatures, each mixture in the Erlenmeyer flask was constantly stirred by shaking the flask at the shaking rate of 120 times per one minute by a shaking incubator. In the enzymatic decomposition step, unrefined soy sauces were produced from the four typed mixtures, respectively. The respective unrefined soy sauces were pressed to produce enzymatically decomposed liquids. The resultant liquids were respectively filtered through paper filters, resulting in the production of seasoning liquids in EXAMPLES G and H, and COMPARATIVE EXAMPLES C and D.

The resultant each seasoning liquid was analyzed on the components included therein. Table 4 summarizes all of the results.

TABLE 3

| MIXTURE | WHEAT GLUTEN (g) | LIQUID KOJI (g) | SALT (g) | WATER (ml) | ZINC-ENRICHED YEAST (g) |
|---|---|---|---|---|---|
| COMPARATIVE EXAMPLE C | 70 | 212 | 23.0 | 0.0 | 0.00 |
| COMPARATIVE EXAMPLE D | 100 | 212 | 32.5 | 88.3 | 0.00 |
| EXAMPLE G | 70 | 212 | 23.0 | 0.0 | 0.14 |
| EXAMPLE H | 100 | 212 | 32.5 | 88.3 | 0.19 |

TABLE 4

| SEASONING LIQUID | ZINC AMOUNT (ppm) | TOTAL NITROGEN AMOUNT (TN) (% w/v) | SALT (% w/v) | GLUTAMIC ACID (Glu) (% w/v) | DISSOLVED SOLID (Brix) (% w/v) | Glu/ TN | Glu/ Brix |
|---|---|---|---|---|---|---|---|
| COMPARATIVE EXAMPLE C | 0 | 3.3 | 9.2 | 5.3 | 35.5 | 1.61 | 0.149 |
| COMPARATIVE EXAMPLE D | 0 | 3.2 | 9.1 | 4.6 | 35.1 | 1.44 | 0.131 |
| EXAMPLE G | 50 | 3.3 | 9.1 | 6.1 | 35.5 | 1.85 | 0.172 |
| EXAMPLE H | 50 | 3.2 | 9.1 | 5.7 | 35.1 | 1.78 | 0.162 |

(Note: The zinc amount represents a pure zinc conversion amount in the enzymatic decomposition liquid after completion of the enzymatic decomposition)

The results summarized in Table 4 indicate the following evidence. First, the ratios of "Glu/TN" and "Glu/Brix" of COMPARATIVE EXAMPLE D in which the liquid koji was diluted with water were about 10% and about 12% more lowered than the ratios of COMPARATIVE EXAMPLE C, respectively. On the other hand, the ratios of "Glu/TN" and "Glu/Brix" of EXAMPLE H in which the liquid koji was diluted with water were about 4% and about 6% more lowered than the ratios of EXAMPLE G, respectively. As a result, according to the method for producing a glutamic acid containing seasoning of the present invention, in which a zinc source is added to the mixture, the influence of diluting the liquid koji with water on the production yield of glutamic acid is apparently smaller than the influence of adding no zinc source to the mixture on the production yield in the methods of COMPARATIVE EXAMPLES C and D.

Example 5

Example of Producing Glutamic Acid Containing Seasoning Powder

To the glutamic acid containing seasoning liquid without the storage, of EXAMPLE C prepared in EXAMPLE 2, was added a dextrin powder in 10% (w/v) in the general method for producing a soy sauce. Then, the resultant mixture was spray-dried (or dried to be powder), whereby a glutamic acid containing seasoning powder was produced, having the analytical values of the compositions as shown below.

(1) Analytical Values of Compositions in Glutamic Acid Containing Seasoning Liquid Total nitrogen amount: 3.6% (w/v); Glutamic acid: 6.5% (w/v): Salt: 9.5% (w/v); and Zinc concentration: 50 ppm.

(2) Analytical Values of Compositions in Glutamic Acid Containing Seasoning Powder Total nitrogen amount: 7.9% (w/w); Glutamic acid: 18.2% (w/w): Salt: 21.0% (w/w); Zinc concentration: 110 ppm; and Water: 1.0% (w/w).

The invention claimed is:

1. A method for producing a glutamic acid containing seasoning liquid, comprising the steps of: adding a zinc containing compound to a mixture of a protein raw material and liquid koji under conditions such that a zinc concentration in a hydrolysate produced by enzymatically hydrolyzing the protein raw material by the liquid koji is set in the range from 5 ppm to 700 ppm; and hydrolyzing enzymatically the protein raw material thereby to produce a glutamic acid containing seasoning liquid.

2. The method for producing a glutamic acid containing seasoning liquid as described in claim 1, wherein the zinc containing compound is zinc sulfate or zinc gluconate.

3. A method for producing a glutamic acid containing seasoning liquid, comprising the steps of: adding zinc yeast to a mixture of a protein raw material and liquid koji under conditions such that a zinc concentration in a protein hydrolysate produced by enzymatically hydrolyzing the protein raw material by the liquid koji is set in the range from 5 ppm to 700 ppm; and hydrolyzing enzymatically the protein raw material thereby to produce a glutamic acid containing seasoning liquid.

4. The method for producing a glutamic acid containing seasoning liquid as described in claim 1, wherein the protein raw material is wheat gluten or an extracted residue of dried and fermented fish shavings.

5. A method for producing a glutamic acid containing seasoning powder, comprising the steps of: drying further the glutamic acid containing seasoning liquid obtained in the method as described in claim 1; and preparing a glutamic acid containing seasoning powder.

6. A method for producing a glutamic acid containing seasoning powder, comprising the steps of: drying further the glutamic acid containing seasoning liquid obtained in the method as described in claim 4; and preparing a glutamic acid containing seasoning powder.

* * * * *